(12) United States Patent
Berry

(10) Patent No.: US 6,859,867 B1
(45) Date of Patent: Feb. 22, 2005

(54) TRANSLATION AND PROTECTION TABLE AND METHOD OF USING THE SAME TO VALIDATE ACCESS REQUESTS

(75) Inventor: Frank L. Berry, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 09/583,950

(22) Filed: May 31, 2000

(51) Int. Cl.$^7$ .............................................. G06F 12/00
(52) U.S. Cl. ..................................... 711/206; 711/207
(58) Field of Search ................................ 711/123, 111, 711/170, 152, 206, 207, 150, 163, 221, 138

(56) References Cited

U.S. PATENT DOCUMENTS

| | | | | |
|---|---|---|---|---|
| 5,581,722 A | * | 12/1996 | Welland | 711/207 |
| 5,915,088 A | * | 6/1999 | Basavaiah et al. | 395/200.28 |
| 6,163,834 A | * | 12/2000 | Garcia et al. | 711/206 |
| 6,243,787 B1 | * | 6/2001 | Kagan et al. | 710/263 |
| 6,243,829 B1 | * | 6/2001 | Chan | 714/7 |
| 6,345,347 B1 | * | 2/2002 | Biran | 711/163 |
| 6,421,769 B1 | * | 7/2002 | Teitenberg et al. | 711/170 |
| 2002/0062402 A1 | * | 5/2002 | Regnier et al. | 709/313 |
| 2003/0163647 A1 | * | 8/2003 | Cameron et al. | 711/138 |

* cited by examiner

Primary Examiner—Mano Padmanabhan
Assistant Examiner—Thang Ho
(74) Attorney, Agent, or Firm—Libby Hope

(57) ABSTRACT

A host may be coupled to a switched fabric and include a processor, a host memory coupled to the processor and a host-fabric adapter coupled to the host memory and the processor and be provided to interface with the switched fabric. The host-fabric adapter accesses a translation and protection table from the host memory for a data transaction. The translation and protection table entries include a region identifier field and a protection domain field used to validate an access request.

16 Claims, 9 Drawing Sheets

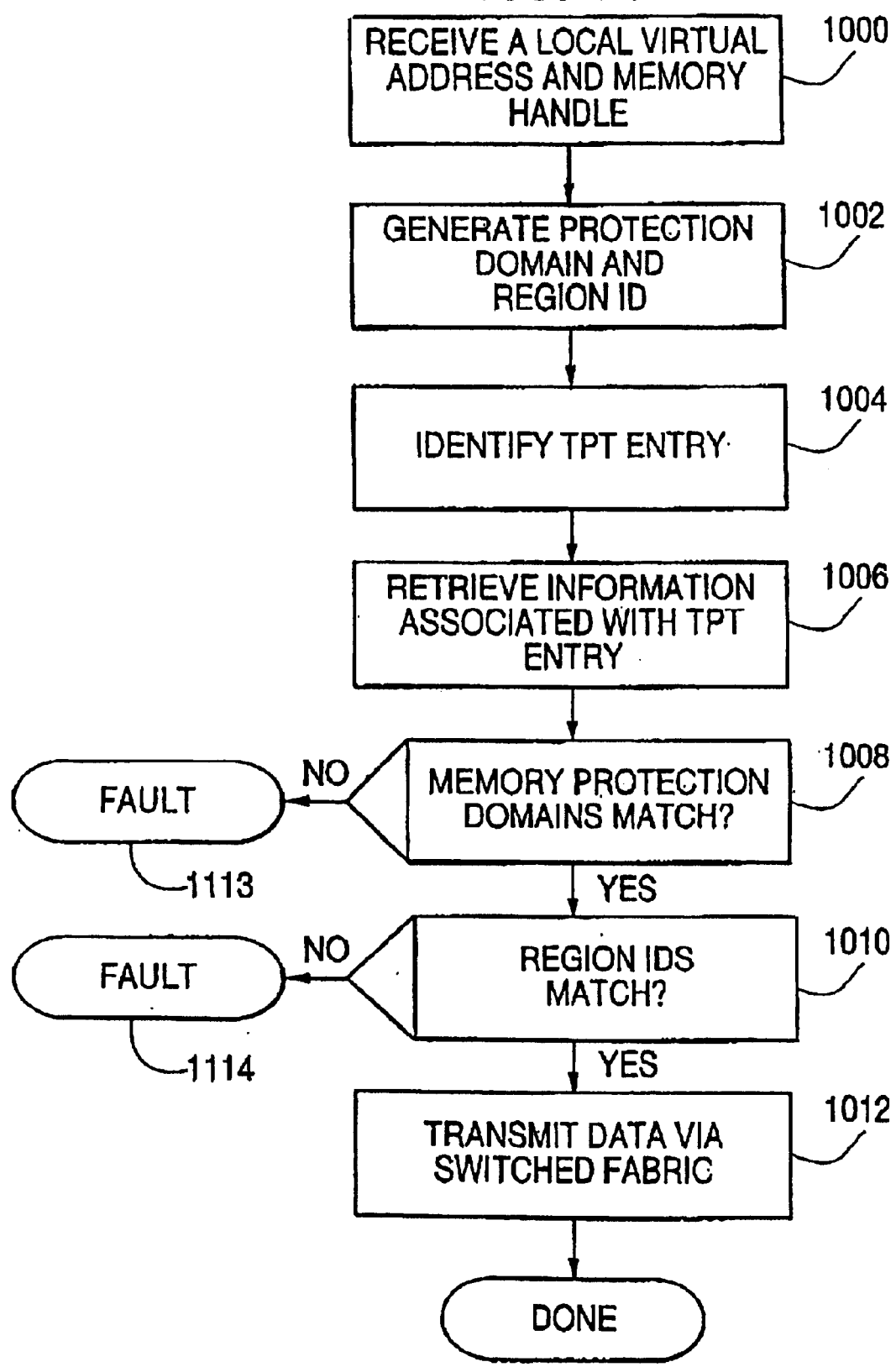

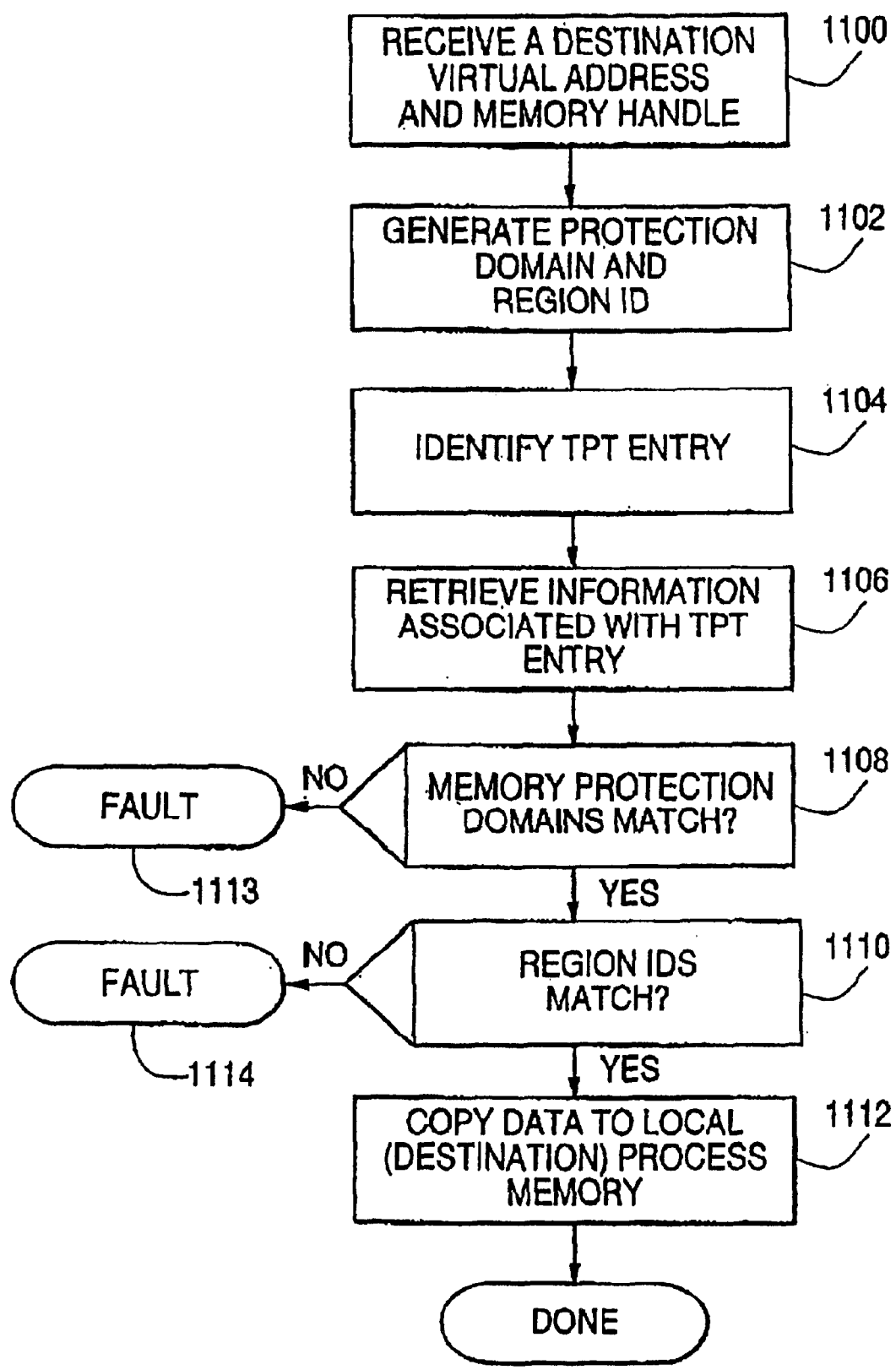

US 6,859,867 B1

TRANSLATION AND PROTECTION TABLE AND METHOD OF USING THE SAME TO VALIDATE ACCESS REQUESTS

TECHNICAL FIELD

The present invention relates to a data network, and more particularly, relates to the arrangement and use of a region identifier field provided in translation entries of a translation and protection table (TPT).

BACKGROUND

In disadvantageous network architectures, the operating system (OS) virtualizes network hardware into a set of logical communication endpoints and multiplexes access to the hardware among these endpoints (e.g., computers, servers and/or I/O devices). The operating system (OS) may also implement protocols that make communication between connected endpoints reliable (e.g., transmission control protocol, TCP).

Generally, the operating system (OS) receives a request to send a message (data) and a virtual address that specifies the location of the data associated with the message, copies the message into a message buffer and translates the virtual address. The OS then schedules a memory copy operation to copy data from the message buffer memory to a target device. A translation and protection table (TPT) may be used to translate the virtual address, received in the form of descriptors, into physical addresses and to define memory regions before a host network adapter can access them (e.g., for transfer to/from a remote device) during data transfer (movement) operations. There is a need for a more efficient technique of using and accessing the translation and protection table (TPT) to perform virtual-to-physical address translations while providing additional memory access protection during data transfer operations.

BRIEF DESCRIPTION OF THE DRAWINGS

A more complete appreciation of example embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIG. 10 illustrates an example send processing technique according to the present invention; and FIG. 11 illustrates an example write processing technique according to the present invention.

DETAILED DESCRIPTION

The present invention is applicable for use with all types of data networks and clusters designed to link together computers, servers, peripherals, storage devices, and communication devices for communications. Examples of such data networks may include a local area network (LAN), a wide area network (WAN), a campus area network (CAN), a metropolitan area network (MAN), a global area network (GAN), a storage area network and a system area network (SAN), including newly developed data networks using Next Generation I/O (NGIO), Future I/O (FIO), Infiniband and Server Net and those networks which may become available as computer technology develops in the future. LAN system may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on exemplary use of a simple data network having several example hosts and I/O units including I/O controllers that are linked together by an interconnection fabric, although the scope of the present invention is not limited thereto.

Figure 1:
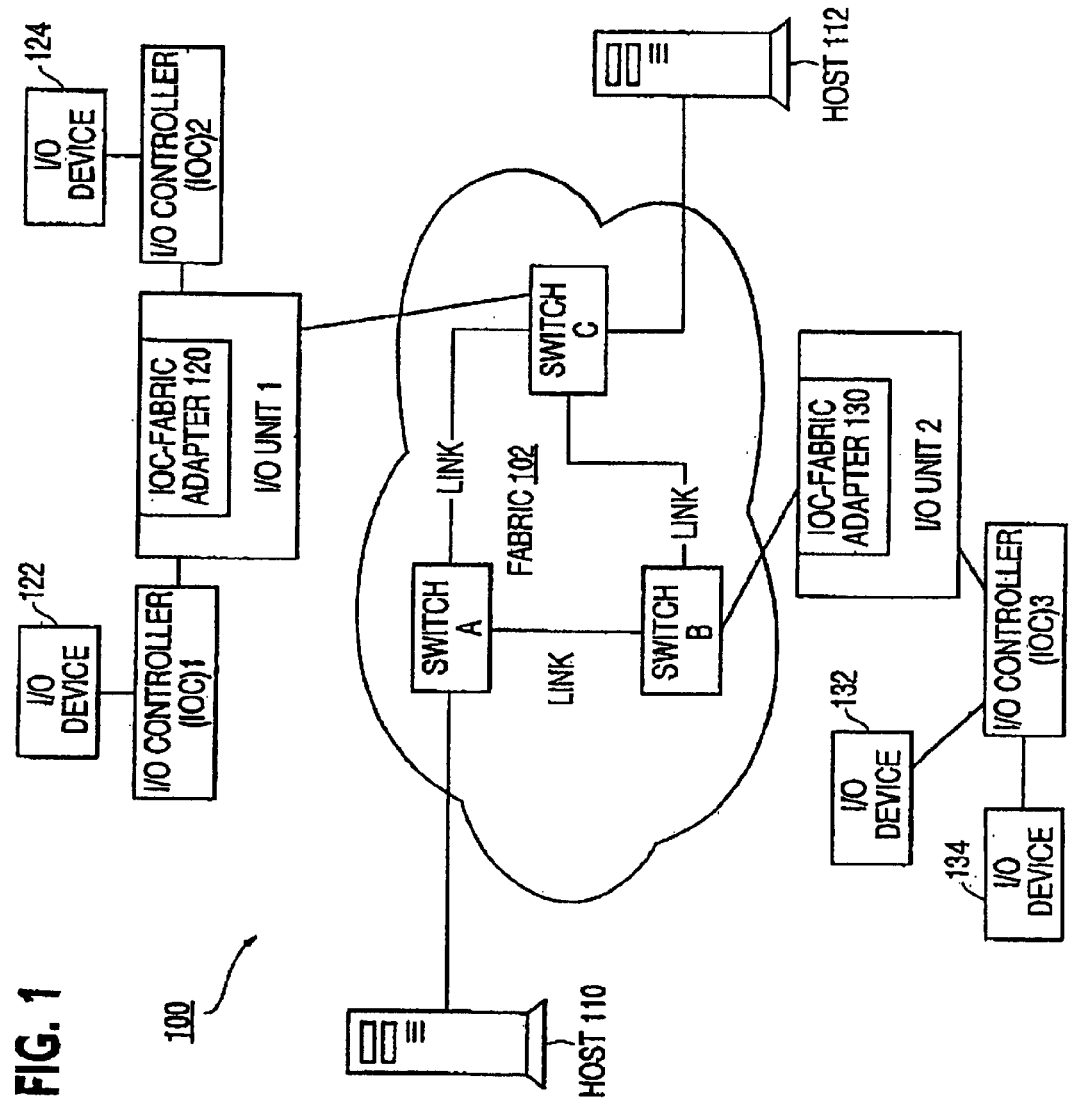
FIG. 1 illustrates an example data network according to an embodiment of the present invention.

Attention now is directed to the drawings and particularly to FIG. 1, an example data network having several interconnected endpoints (nodes) for data communications is illustrated. As shown in FIG. 1, the data network 100 may include, for example, an interconnection fabric (hereinafter referred to as "switched fabric") 102 of one or more switches A, B and C and corresponding physical links, and several endpoints (nodes) which may correspond to one or more I/O units 1 and 2, computers and servers such as, for example, host 110 and host 112. I/O unit 1 may include one or more controllers connected thereto, including I/O controller 1 (IOC1) and I/O controller 2 (IOC2). Likewise, I/O unit 2 may include an I/O controller 3 (IOC3) connected thereto. Each I/O controller 1, 2 and 3 (IOC1, IOC2 and IOC3) may operate to control one or more I/O devices. For example, I/O controller 1 (IOC1) of the I/O unit 1 may be connected to I/O device 122, while I/O controller 2 (IOC2) may be connected to I/O device 124. Similarly, I/O controller 3 (IOC3) of the I/O unit 2 may be connected to I/O devices 132 and 134. The I/O devices may be any of several types of I/O devices, such as storage devices (e.g., a hard disk drive, tape drive) or other I/O device.

The hosts and I/O units including attached I/O controllers and I/O devices may be organized into groups known as clusters, with each cluster including one or more hosts and typically one or more I/O units (each I/O unit including one or more I/O controllers). The hosts and I/O units may be interconnected via a switched fabric 102, which is a collection of switches A, B and C and corresponding physical links connected between the switches A, B and C.

In addition, each I/O unit includes one or more I/O controller-fabric (IOC-fabric) adapters for interfacing between the switched fabric 102 and the I/O controllers (e.g., IOC1, IOC2 and IOC3). For example, IOC-fabric adapter 120 may interface the I/O controllers 1 and 2 (IOC1 and IOC2) of the I/O unit 1 to the switched fabric 102, while IOC-fabric adapter 130 interfaces the I/O controller 3 (IOC3) of the I/O unit 2 to the switched fabric 102.

The specific number and arrangement of hosts, I/O units, I/O controllers, I/O devices, switches and links shown in FIG. 1 are provided simply as an example data network. A wide variety of implementations and arrangements of any number of hosts, I/O units, I/O controllers, I/O devices, switches and links in all types of data networks may be possible.

Figure 2:
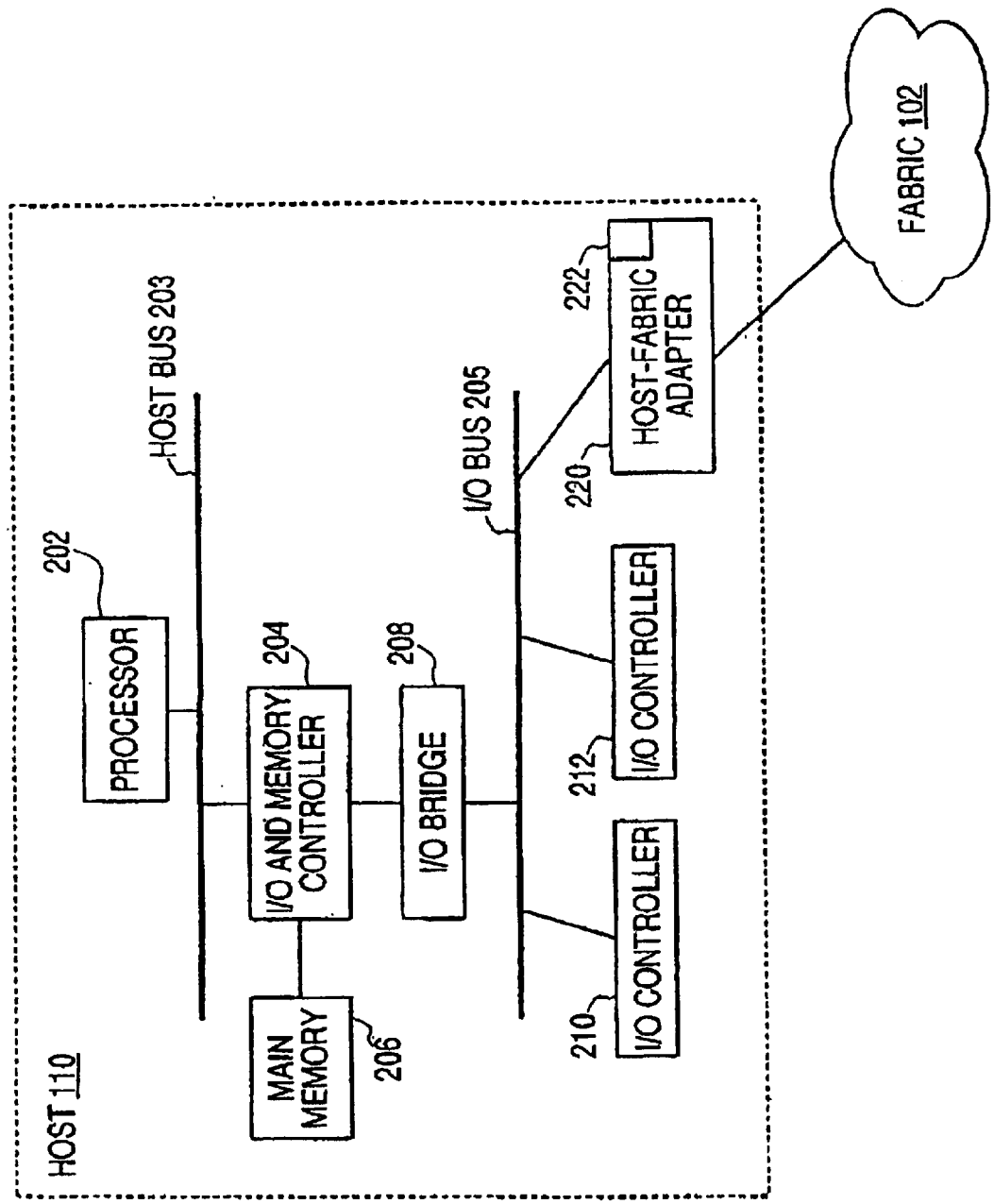
FIG. 2 illustrates a block diagram of a host of an example data network according to an embodiment of the present invention.

An example embodiment of a host (e.g., host 110 or host 112) may be shown in FIG. 2. Referring to FIG. 2, a host 110 may include a processor 202 coupled to a host bus 203. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including I/O controllers 210 and 212. I/O controllers 210 and 212 (including any I/O devices connected thereto) may provide bus-based I/O resources.

One or more host-fabric adapters 220 may also be connected to the I/O bus 205. Alternatively, the host-fabric adapter 220 may be connected directly to the I/O and memory controller (or chipset) 204 to avoid the inherent limitations of the I/O bus 205 (see FIG. 3). In either situation, the host-fabric adapter 220 may be considered to be a type of a network interface card (e.g., NIC which usually includes hardware and firmware) for interfacing the host 110 to a switched fabric 102. The host-fabric adapter 220 may be utilized to provide fabric communication capabilities for the host 110. For example, the host-fabric adapter 220 converts data between a host format and a format that is compatible with the switched fabric 102. For data sent from the host 110, the host-fabric adapter 220 formats the data into one or more packets containing a sequence of one or more cells including header information and data information.

According to one example embodiment or implementation, the hosts or I/O units of the data network of the present invention may be compatible with an Infiniband architecture. Infiniband information/specifications are presently under development and will be published by the Infiniband Trade Association (formed Aug. 27, 1999) having the Internet address of http://www.Infinibandta.org. The hosts of I/O units of the data network may also be compatible with the *"Next Generation Input/Output (NGIO) Specification"* as set forth by the NGIO Forum on Mar. 26, 1999. The host-fabric adapter 220 may be a Host Channel Adapter (HCA), and the IOC-fabric adapters may be Target Channel Adapters (TCA). The host channel adapter (HCA) may be used to provide an interface between the host 110 or 112 and the switched fabric 102 via high speed serial links. Similarly, target channel adapters (TCA) may be used to provide an interface between the switched fabric 102 and the I/O controller of either an I/O unit 1 or 2, or another network, including, but not limited to, local area network (LAN), wide area network (WAN), Ethernet, ATM and fibre channel network, via high speed serial links. Both the host channel adapter (HCA) and the target channel adapter (TCA) may be implemented in the Infiniband architecture or in compliance with *"Next Generation I/O Architecture: Host Channel Adapter Software Specification, Revision 1.0"* as set forth by Intel Corp., on May 13, 1999. In addition, each host may contain one or more host-fabric adapters (e.g., HCAs). However, Infiniband and NGIO are merely example embodiments or implementations of the present invention, and the invention is not limited thereto. Rather, the present invention may be applicable to a wide variety of data networks, hosts and I/O controllers.

Figure 3:
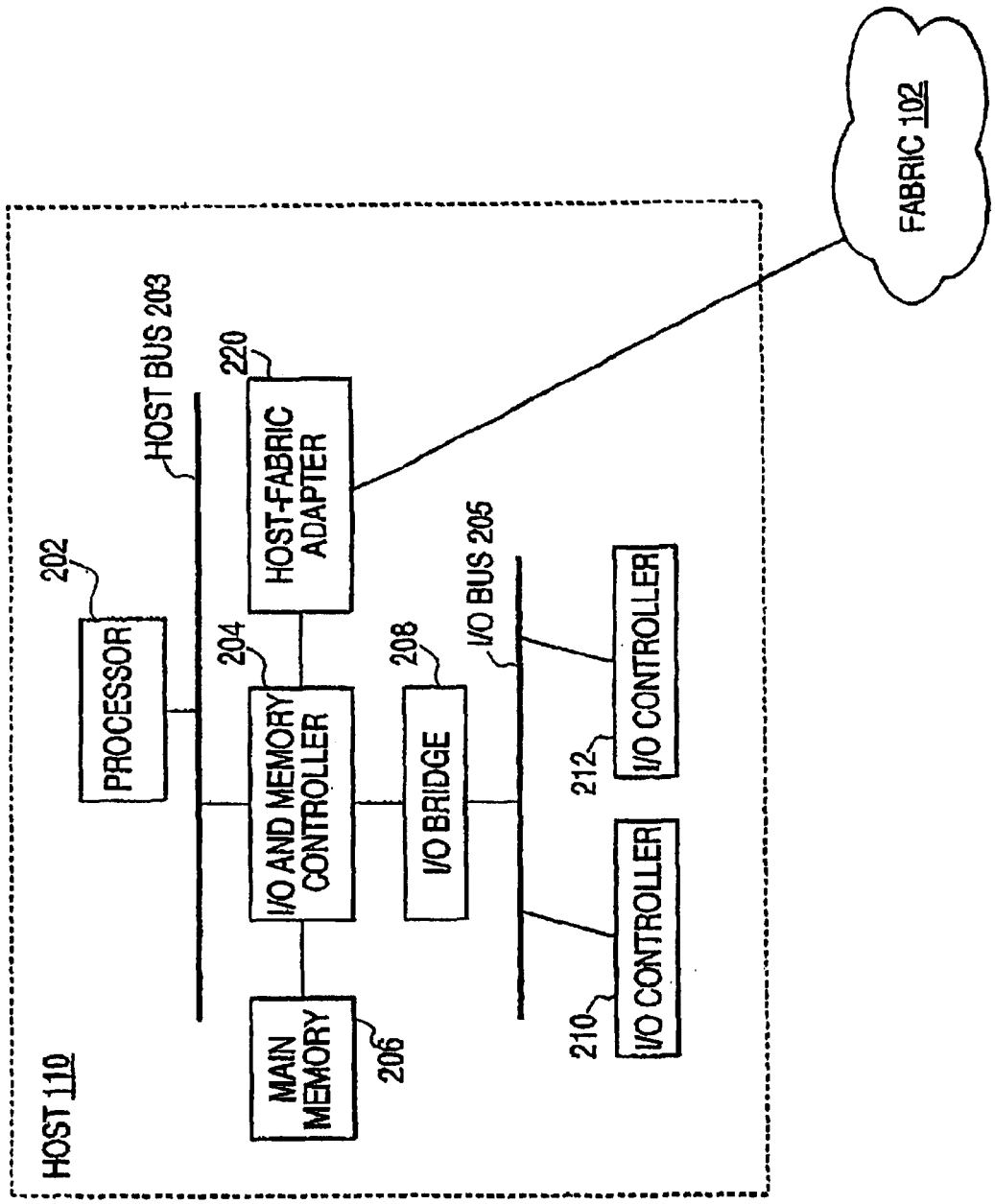
FIG. 3 illustrates a block diagram of a host of an example data network according to another embodiment of the present invention.

As described with reference to FIGS. 2–3, the I/O units and respective I/O controllers may be connected directly to the switched fabric 102 rather than as part of a host 110. For example, I/O unit 1 including I/O controllers 1 and 2 (IOC1 and IOC2) and I/O unit 2 including an I/O controller 3 (IOC3) may be directly (or independently) connected to the switched fabric 102. In other words, the I/O units (and their connected I/O controllers and I/O devices) are attached as separate and independent I/O resources to the switched fabric 102 as shown in FIGS. 1–3, as opposed to being part of a host 110. As a result, I/O units including I/O controllers (and I/O devices) connected to the switched fabric 102 may be flexibly assigned to one or more hosts (rather than having a predetermined or fixed host assignment based upon being physically connected to the host's local I/O bus). The I/O units, I/O controllers and I/O devices which are attached to the switched fabric 102 may be referred to as fabric-attached I/O resources (i.e., fabric-attached I/O units, fabric-attached I/O controllers and fabric-attached I/O devices) because these components are directly attached to the switched fabric 102 rather than being connected as part of a host.

In addition, the host 110 may detect and then directly address and exchange data with I/O units and I/O controllers (and attached I/O devices) which are directly attached to the switched fabric 102 (i.e., the fabric-attached I/O controllers), via the host-fabric adapter 220. A software driver stack for the host-fabric adapter 220 may be provided to allow host 110 to exchange data with remote I/O controllers and I/O devices via the switched fabric 102, while preferably being compatible with many currently available operating systems, such as Windows 2000. The host-fabric adapter 220 may include an internal cache 222.

Figure 4:
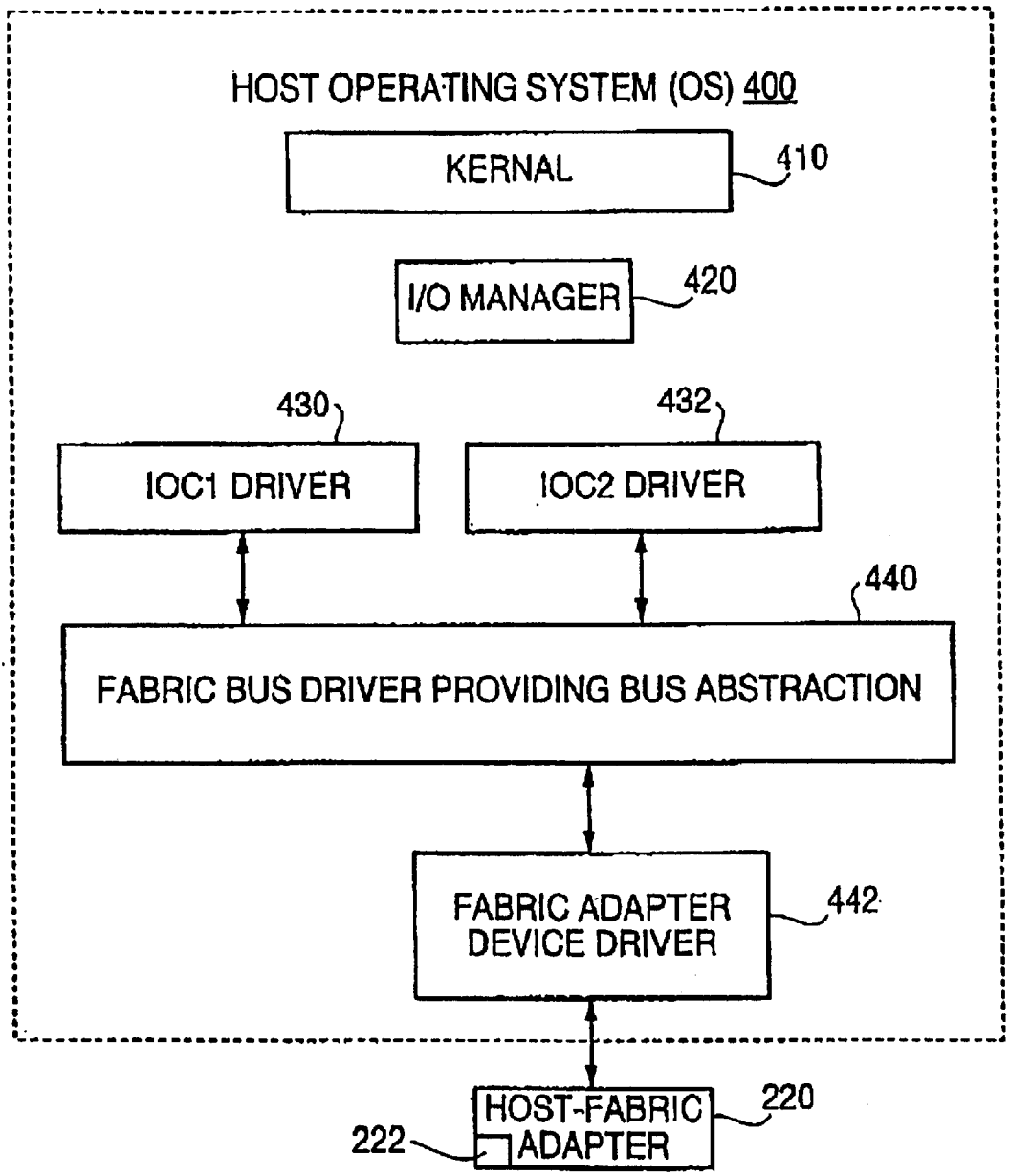
FIG. 4 illustrates an example software driver stack of a host of an example data network according to an embodiment of the present invention.

FIG. 4 illustrates an example software driver stack of a host 110 having fabric-attached I/O resources according to an example embodiment of the present invention. As shown in FIG. 4, the host operating system (OS) 400 includes a kernel 410, an I/O manager 420, and a plurality of I/O controller drivers for interfacing to various I/O controllers, including I/O controller drivers 430 and 432. According to an example embodiment, the host operating system (OS) 400 may be Windows 2000, and the I/O manager 420 may be a Plug-n-Play manager.

In addition, a fabric adapter driver software module may be provided to access the switched fabric 102 and information about fabric configuration, fabric topology and connection information. Such a driver software module may include a fabric bus driver (upper driver) 440 and a fabric adapter device driver (lower driver) 442 utilized to establish communication with a target fabric-attached agent (e.g., I/O controller), and perform functions common to most drivers, including, for example, channel abstraction, send/receive I/O transaction messages, remote direct memory access (RDMA) transactions (e.g., read and write operations), queue management, memory registration, descriptor management, message flow control, and transient error handling and recovery. Such software module may be provided on a tangible medium, such as a floppy disk or compact disk (CD) ROM, or via Internet downloads, which may be available for plug-in or download into the host operating system (OS) or any other viable method.

The host 110 may communicate with I/O units and I/O controllers (and attached I/O devices) which are directly attached to the switched fabric 102 (i.e., the fabric-attached I/O controllers) using a Virtual Interface (VI) architecture. Under the *"Virtual Interface (VI) Architecture Specification, Version 1.0,"* as set forth by Compaq Corp., Intel Corp., and Microsoft Corp., on Dec. 16, 1997, the VI architecture comprises four basic components: virtual interface (VI) of pairs of works queues (send queue and receive queue), VI consumer which may be an application program, VI provider which may be hardware and software components responsible for instantiating VI, and completion queue (CQ). VI is the mechanism that allows VI consumers to directly access a VI provider. Each VI represents a communication endpoint, and endpoint pairs may be logically connected to support bi-directional, point-to-point data transfer. Under the VI architecture, the host-fabric adapter 220 and VI kernel agent may constitute the VI provider to perform endpoint virtualization directly and subsume the tasks of multiplexing, de-multiplexing, and data transfer scheduling normally performed by the host operating system (OS) kernel 410 and device driver 442 as shown in FIG. 4.

Figure 5:
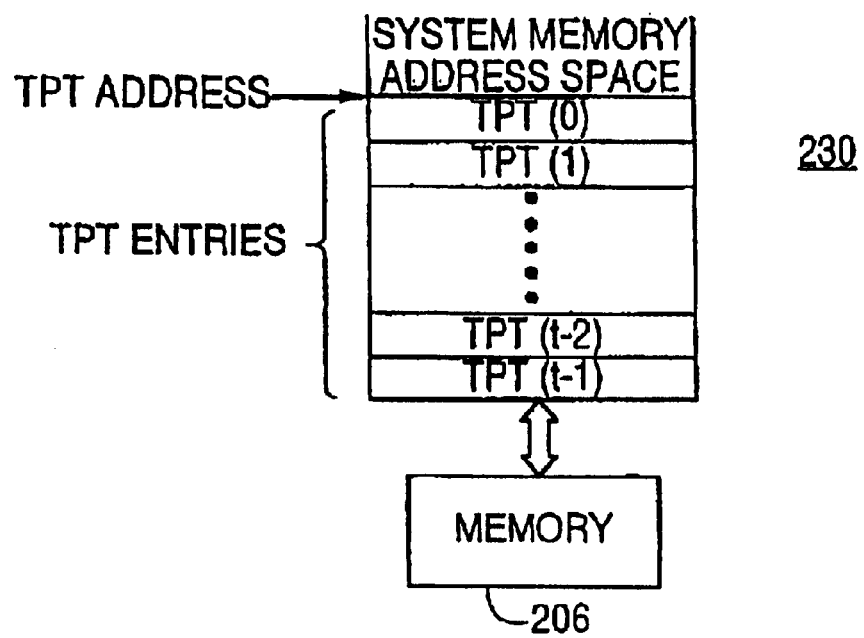
FIG. 5 illustrates an example translation and protection table.

The translation and protection table (TPT) 230 shown in FIG. 5 may be used to translate virtual addresses, received in a form of packet descriptors (e.g., a data structure that describes a request to move data), into physical addresses and to define memory regions of the host memory 206 that may be accessed by the host-fabric adapter 220 (validate access to host memory). In addition, the translation and protection table (TPT) 230 may also be used to validate access permission rights of the host-fabric adapter 220 and to perform address translation before accessing any other memory in the host 110. The translation and protection table (TPT) 230 may contain a plurality of TPT entries, for example, TPT(0), TPT(1) . . . TPT(t−2) and TPT(t−1), in the system memory address space. Each TPT entry (also called translation entry) may represent a single page of the host memory 206, typically 4 KB of physically contiguous host memory 206. The TPT table 230 may be stored within the host memory 206 or it may be stored in a different memory area of the host 110.

Figure 6:
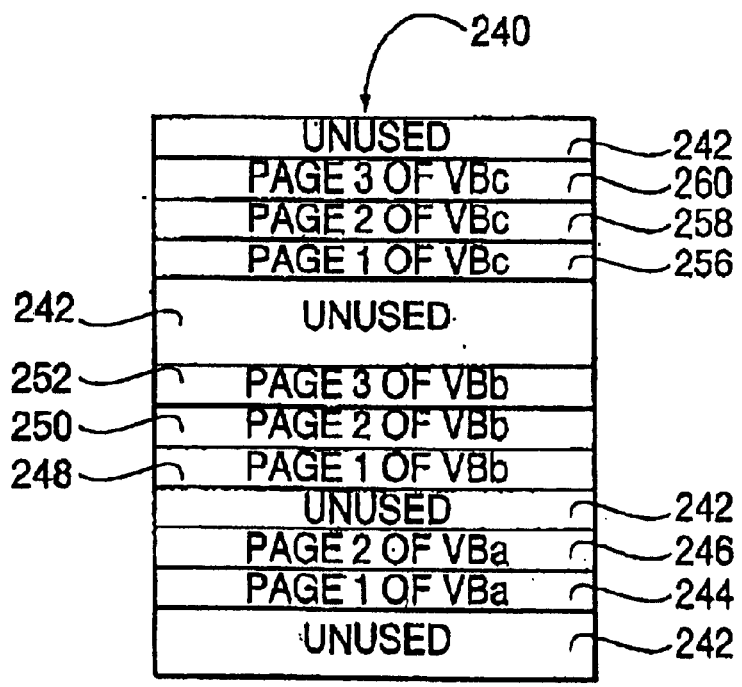
FIG. 6 illustrates an example translation and protection table.

FIG. 6 illustrates another translation and protection table (TPT) 240 that may be used to translate virtual addresses into physical addresses. As discussed above, the translation and protection table 240 may validate access permission rights of the host-fabric adapter 220 and perform address translation before accessing any other memory in the host 110. Each translation and protection table 240 may contain a plurality of entries that are associated with virtual buffers. For the example shown in FIG. 6, three virtual buffers may be associated with the translation protection table 240, namely virtual buffer A(VBa), virtual buffer B(VBb) and virtual buffer C(VBc). Each translation entry in the example of FIG. 6 may correspond to one page of a virtual buffer, or 4 KB of data. For this example, virtual buffer A includes 8 KB of data, virtual buffer B includes 12 KB of data and virtual buffer C includes 12 KB of data. Accordingly, the translation protection table 240 includes entries 244 and 246 for the addresses of page 1 and page 2 of virtual buffer A, respectively. The translation and protection table 240 also includes entries 248, 250 and 252 for the addresses of page 1, page 2 and page 3 of virtual buffer B, respectively. The translation and protection table 240 further includes entries 256, 258 and 260 for the addresses of page 1, page 2 and page 3 of virtual buffer C, respectively. The translation and protection table 240 may also include unused portions 242 that separate the pages of the different virtual buffers. That is, an unused portion 242 may separate the pages of virtual buffer A from the pages of virtual buffer B and a similar unused portion 242 may separate the pages of virtual buffer B from the pages of virtual buffer C. The unused portions 242 may also be provided at the beginning and end of the translation and protection table.

Figure 7:
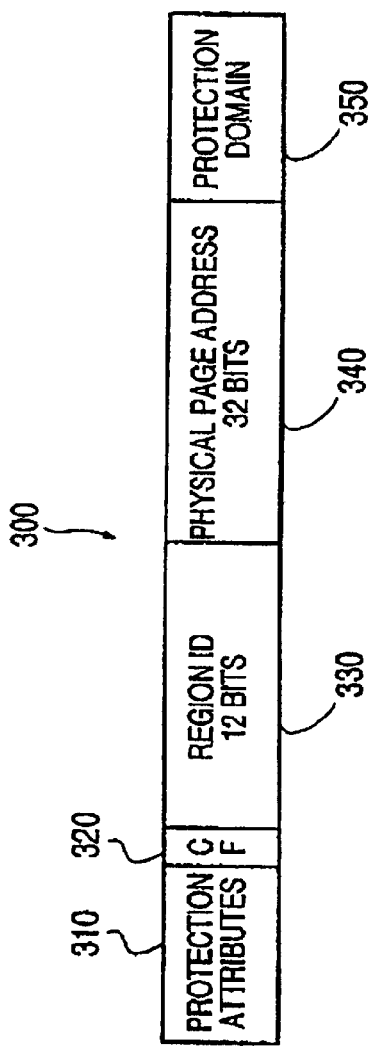
FIG. 7 illustrates an example translation and protection table entry according to the present invention.

FIG. 7 shows an example translation and protection table entry that includes a region identifier (also called region ID) field 330 in accordance with the present invention. Each TPT entry 300 may correspond to a single registered memory page and include a series of protection attributes (also referred to as access rights) 310, a translation cacheable flag 320, a region identifier field 330, a physical page address field 340, and a protection domain field 350. The protection domain field 350 may also be referred to as a protection tag field, especially with respect to a NGIO architecture.

The protection attributes 310 may include, for example, a Memory Write Enable flag that indicates whether the host-fabric adapter 220 can write to a page (e.g., "1" page is write-enable, "0" page is not write-enable); a RDMA Read Enable flag that indicates whether the page can be a source of RDMA Read operation (e.g., "1" page can be source, "0" page cannot be source); and a RDMA Write Enable flag that indicates whether the page can be a target of RDMA Write operation (e.g., "1" page can be target, "0" page can not be target). The protection attributes 310 may control read and write access to a given memory region. These permissions are generally set for memory regions and virtual interfaces (VIs) when they are created, but may be modified later by changing the attributes of the memory region, and/or of the VI. If the protection attributes between a VI and a memory region do not match (during an attempted access), the attribute offering the most protection will be honored. For instance, if a VI has RDMA Read Enabled, but the memory region does not, the result is that RDMA reads on that VI from that memory region will fail. RDMA Read and Write access attributes are enforced at the remote end of a connection that is referred to by the descriptor. The Memory Write Enable access attribute is enforced for all memory access to the associated page. An attempted message transfer operation that violates a memory region's permission settings may result in a memory protection error and no data is transferred.

The translation cacheable flag 320 may be utilized to specify whether the host-fabric adapter 220 may cache addresses across transaction boundaries. If the translation cacheable flag 320 is not set ("0" flag), the host-fabric adapter 220 may flush or discard a corresponding single TPT entry from the internal cache 222 and retranslate buffer and/or descriptor addresses each time a new transaction is processed. However, if the translation cacheable flag 320 is set ("1" flag), the host-fabric adapter 220 may choose to reserve or keep the corresponding single TPT entry in the internal cache 222 for future re-use. This way only a designated TPT entry as opposed to all TPT entries stored in the internal cache 222 at the end of an IO transaction may be flushed or discarded from the internal cache 222. Since the host-fabric adapter 220 is instructed to flush or discard individual TPT entries as opposed to all cached TPT entries stored in the internal cache 222 at the end of an IO transaction, the number of times the host-fabric adapter 220 must flush cached address translations in the internal cache 222 may be drastically reduced. The software driver of the host operating system 400 (see FIG. 4) may be used to set the status of the translation cacheable flag 320 of each individual TPT entry stored in the internal cache 222.

The physical page address field 340 may include the physical page frame address of the entry. The protection domain field 350 includes identifiers that are associated both with VIs and with host memory regions to define the access permission. Memory access may be allowed by the host-fabric adapter 220 if the protection domain field of the VI and of the memory region involved are identical. Attempted memory accesses that violate this rule may result in a memory protection error and no data is transferred. While the protection domain 350 may be used to deny or allow access to the translation and protection table, it is possible that different virtual buffers may be associated with a similar protection domain (or protection tag). In this situation, a wrong address may be accessed for the virtual buffer. Stated differently, in cases where the virtual address supplied with the memory handle is outside of the range of addresses in the associated memory region, the combination of that address and the memory handle can point to a translation entry of a different memory region that contains the same protection domain as the associated memory region. This error could allow the contents of the memory regions to be corrupted without detection.

The region identifier field 330 is provided to further deny or allow access to the translation and protection table. The region identifier field 330 provides memory access by the host-fabric adapter 220 if the region identifier field of the virtual interface and of the memory region involved are identical. The region identifier field 330 thereby provides further protection functionality. Each translation entry associated with a specific memory region contains the same region identifier.

FIG. 7 shows a region identifier field 330 that would include a 12 bit region identifier. The use of 12 bits is merely an example embodiment. The present invention is not limited to this number of bits as other lengths of bits for the region identifier field 330 may also be provided in accordance with the present invention. The region identifier field 330 is used to determine whether a protection violation may occur and thus access to memory is denied. This use of the region identifier field 330 provides unique advantages such as the ability to additionally deny or allow access to the buffers based on information other than the protective domain field 350. As will be discussed below in greater detail, the region identifier field 330, unlike the protection domain field 350, is mathematically related to the entries within the translation and protection table and therefore helps to further distinguish between virtual buffers. Accordingly, the region identifier field 330 may be used to deny or allow access to a memory region even if different virtual buffers are associated with a similar protection domain.

Figure 8:
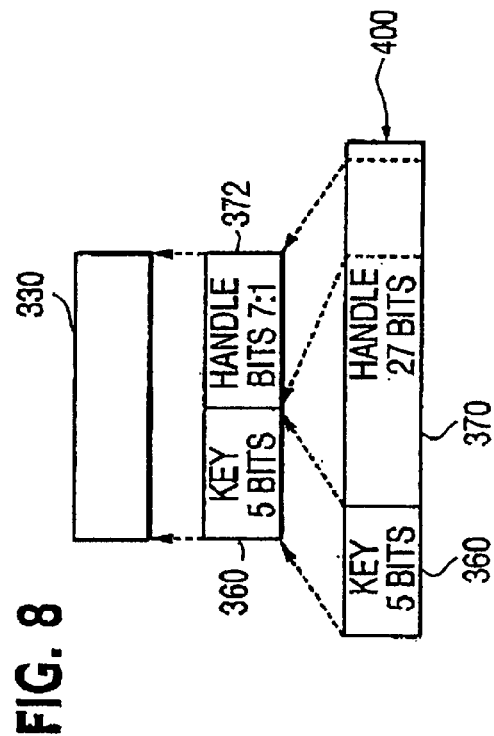
FIG. 8 illustrates one example embodiment of how the region identifier field may be created in accordance with the present invention.

FIG. 8 shows one embodiment of how the region identifier field 330 may be obtained during memory registration or address translation by using a memory handle 400. The handle 400 may be 32 bits and include a 27 bit handle portion 370 and a 5 bit key portion 360. The 27 bit handle portion 370 is mathematically related to a specific translation entry and thus is related to a physical address of the data. The 5-bit key portion 360, on the other hand, may be assigned by the control software when a virtual memory buffer is registered. The 5 bit key portion 360 may be selected by any number of means such as a sequential value. For example, the control software may retain a copy of the value of the last key portion used for each protection domain (i.e., for each memory buffer). When a memory registration operation is requested, the control software may look at the last key portion used for a given protection domain (i.e., for one memory buffer) and then advance that value to the next sequential value. The new value of the key portion may be saved and used as the 5 bits of the key portion 360. Other algorithms for advancing the value of the key portion 360 may also be used, such as random selection. The host-fabric adapter 220 may determine the region identifier field 330 by combining the 5 bit key portion 360 with the lower seven bits 372 of the 27 bit handle portion 370. However, the 5 bits of the key portion 360 and the lower seven bits 372 of the 27 bit handle portion 370 are merely an example embodiment. The present invention is also applicable to other lengths for both the key portion 360 and the handle portion 370 and the combination thereof.

The 32 bit handle 400 may be supplied as part of the operation of requesting access to memory via the host channel adapter 220. For operations arriving from a remote host, the incoming message may contain the virtual address, the handle and the length of the request. For operations originating on the local host, the outgoing descriptor may contain the virtual address, the handle and the length of the buffers to be accessed. As discussed above, the 12 bit region identifier field 330 may be generated from a 32 bit handle 400, which includes the 5 bit key portion 360 and the 27 bit handle portion 370.

For purposes of completeness, data transfer operations between host 110 and I/O units and I/O controllers attached to the switched fabric 102 using TPT entries may be described as follows. Data transfer requests may be represented by descriptors. There are two general types of descriptors, send/receive and read/write (RDMA). Descriptors are data structures organized as a list of segments. Each descriptor may begin with a control segment followed by an optional address segment and an arbitrary number of data segments. Control segments may contain control and status information. Address segments, for read/write operations, may contain remote buffer information (i.e., memory associated with the VI targeted to receive the read/write request). Data segments for both send/receive and read/write operations may contain information about the local memory (i.e., memory associated with the VI issuing the send/receive or read/write request).

Figure 9A:
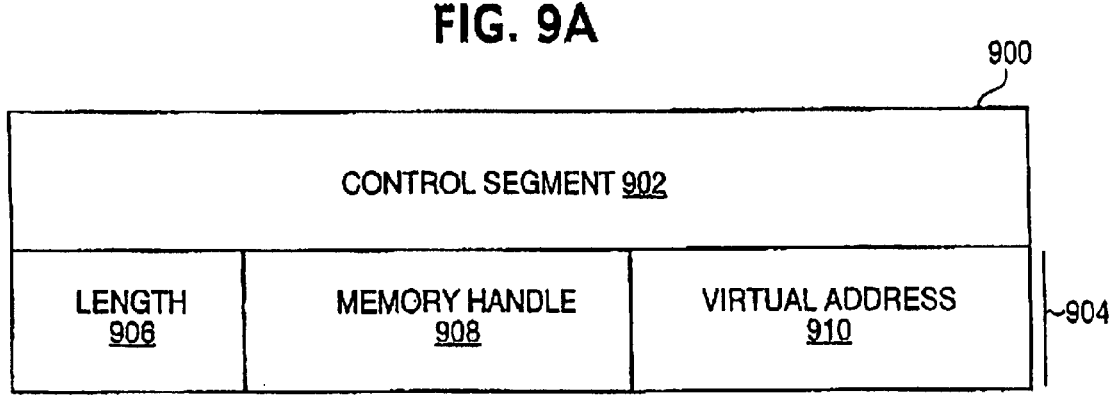
FIGS. 9A and 9B illustrate examples of descriptors.

FIG. 9A illustrates an example send/receive type descriptor 900 having a control segment 902 and a data segment 904. Data segment 904, in turn, has a segment length field 906, a memory handle field 908, and a virtual address field 910. The segment length field 906 specifies the length of the message to be sent or that is to be received. The memory handle field 908 may be used to verify that the sending/requesting process owns the registered memory region indicated by segment length 906 and virtual address 910. In one embodiment, the memory handle 908 may be 32 bits in length, corresponding to the 32 bit handle 400 shown in FIG. 8 that includes the 5 bit key portion 360 and the 27 bit handle portion 370. The 12 bit region identifier field 330 may be formed from this memory handle 908. For a send operation, the virtual address 910 identifies the starting memory location of the message (i.e., data) to be sent in the sending VI's local memory space. For a receive operation, the virtual address 910 identifies the starting memory location of where the received message (data) is to be stored in the requesting VI's local memory space.

Figure 9B:
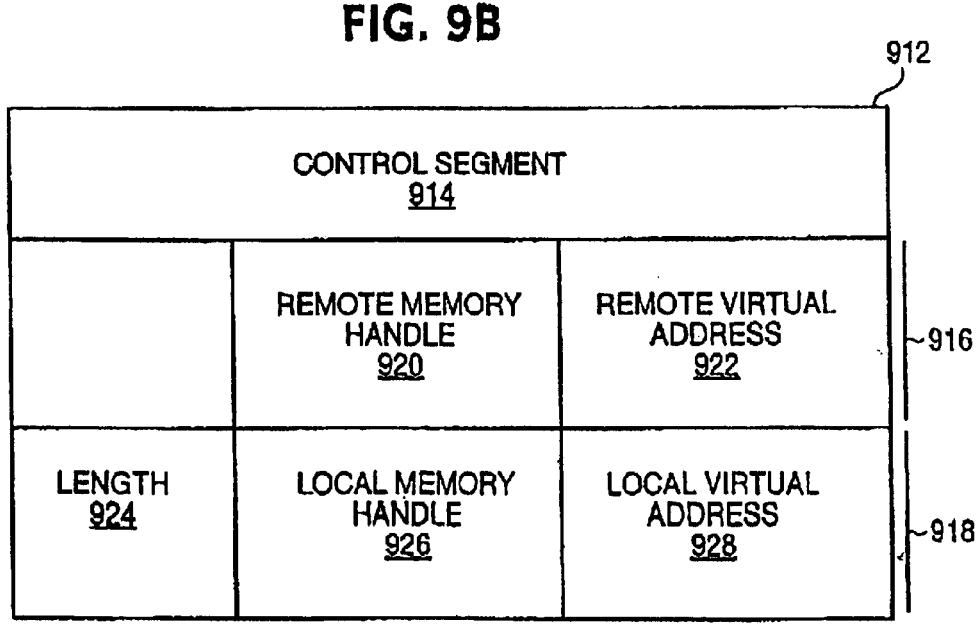

FIG. 9B illustrates an example read/write type descriptor 912 having a control segment 914, an address segment 916, and a data segment 918. The address segment 916 has a remote memory handle field 920 and a remote virtual address field 922. The data segment 918 has a segment length field 924, a local memory handle field 926, and a local virtual address field 928. Similar to that discussed above, the remote memory handle 920 and the local memory handle 926 may be 32 bits in length, corresponding to the 32 bit handle 400 shown in FIG. 8 that includes the 5 bit key portion 360 and the 27 bit handle portion 370. For a read operation, the remote virtual address 922 identifies the memory location in the remote process' memory space, of the message (data) to be read. The local virtual address 928 identifies the starting memory location in the local process' memory space of where the received message is to be placed. The amount of memory to be used to store the message is specified by the segment length field 924. For a write operation, the remote virtual address 922 identifies the memory location in the local process' memory space of the message (data) to be written. The local virtual address 928 identifies the starting memory location in the local process' memory space of where the message being written is stored. The size of the message is specified by the segment length field 924. The remote memory handle 920 is that memory handle associated with the memory identified by remote virtual address 922. The local memory handle 926 is that memory handle associated with the memory identified by local virtual address 928 and may be 32 bits in length including a 5 bit key portion 360 and a 27 bit handle portion 370. The 12 bit region identifier field 330 may be formed from this local memory handle 926.

When a descriptor is processed by the host-fabric adapter 220, the virtual address and the associated memory handle may be used to generate a protection domain (or protection tag or protection index). As discussed above, the protection domain may be used to identify a TPT entry that corresponds to a single page of registered memory on which the posted descriptor is located. The 32 bit handle 400 may also be used to generate the region identifier field 330 as discussed above by using the 5 bit key portion 360 and the lower 7 bits of the 27 bit handle portion 370. If the generated region identifier field corresponds with the region identifier field of the TPT table 240 and the protection domains also match, then access to the addresses within the TPT table 240 is allowed. On the other hand, if the generated region identifier field does not correspond with the region identifier field of the TPT table 240, then access to the address is denied. From the identified TPT entry, the physical address associated with the virtual address may be obtained. In send and receive operations, virtual address and the memory handles correspond to memory handle field 908 and virtual address field 910 of FIG. 9A. In read and write operations, the virtual address and memory handle correspond to the remote memory handle 920 and remote virtual address field 922 on the remote host-fabric adapter, and local memory handle field 926 and local virtual address field 928 on the local host-fabric adapter 220 of FIG. 9B.

An example send descriptor may be processed by the host-fabric adapter 220 in the manner as shown in FIG. 10. The order of the blocks in FIG. 10 are merely an example embodiment as the blocks may be performed in other orders in accordance with the present invention. In block 1000, the host-fabric adapter 220 retrieves the message's starting virtual address 910 (in the local, or sending process' memory space), and a memory handle 908 associated with the message's memory region. The virtual address 910 and the memory handle 908 may be used to generate a protection domain (block 1002). The memory handle 908 may also be used to generate the region identifier field 330 as discussed above. The protection domain and the region identifier field 330 may be used to identify and retrieve translation information stored in a TPT entry that corresponds to a single page of registered memory on which the posted descriptor is located (blocks 1004 and 1006). If the retrieved protection domain matches the protection domain associated with the local (sending) process ('yes' prong of block 1008), and if the retrieved region identifier field and the sending process' region identifier field match ('yes' prong of block 1010), then the host-fabric adapter 220 sends the message toward the destination (remote) by transmitting (block 1012) the same (the message or data) via the switched to fabric 102 (see FIGS. 1–3). If the retrieved protection domain and the sending process' protection domain do not match ('no' prong of block 1008) or if the retrieved region identifier field and the sending process' region identifier field do not match ('no' prong of block 1010) then a memory protection fault may be generated (blocks 1113 and 1114) and no data is transferred via the switched fabric 102. Receive descriptors may be processed in an analogous fashion.

Similarly, an example read descriptor may be processed by the host-fabric adapter 220 in the manner as shown in FIG. 11. The order of the blocks in FIG. 11 are merely an example embodiment as the operations may be performed in other orders in accordance with the present invention. In block 1100, the host-fabric adapter 220 retrieves the message's destination virtual address 928 (in the local, or receiving process' memory space), a memory handle 926 associated with the message's destination memory region, and indication of how long the incoming message is. The virtual address 928 and memory handle 926 may be used to generate a protection domain (block 1102). The memory handle 926 may be used to generate the region identifier field 330 as discussed above. The protection domain is used to identify and retrieve translation information stored in a TPT entry that corresponds to a single page of registered memory on which the posted descriptor is located (blocks 1104 and 1106). If the retrieved protection domain matches the protection domain associated with the local (receiving) process ('yes' prong of block 1108) and if the retrieved region identifier field and the sending process' region identifier field match, ('yes' prong of block 1110), then the host-fabric adapter 220 copies (block 1112) the message into the local process' memory. If the retrieved protection domain and the receiving process' protection domain do not match ('no' prong of block 1108) or if the retrieved region identifier field and the sending process' region identifier field 330 do not match ('no" prong of block 1110), then a memory protection fault is generated (blocks 1113 or 1114) and no data is transferred via the switched fabric 102. Write descriptors may be processed in an analogous fashion.

FIGS. 10 and 11 show one embodiment of using a protection domain and region identifier field to validate an access request. The order of operations shown in these figures is not limited by the disclosed order as these operations may be performed in other orders.

One further advantage of the present invention is that each time an address is translated and its protection is checked, only one access to the translation and protection table is needed.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. For example, the present invention is applicable to all types of redundant type networks, including, but not limited to, Infiniband, Next Generation Input/Output (NGIO), ATM, SAN (system area network, or storage area network), server net, Future Input/Output (FIO), fiber channel, Ethernet). In addition, the process shown in FIGS. 10 and 11 may be performed by a computer processor executing instructions organized into a program module or a custom designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Many modifications may be made to adapt the teachings of the present invention to a particular situation without departing from the scope thereof. Therefore, it is intended that the present invention not be limited to the various example embodiments disclosed, but that the present invention includes all embodiments falling within the scope of the appended claims.

What is claimed is:

1. A method comprising:
generating a protection domain from a virtual address and a memory handle of a descriptor associated with a data transfer request;
generating a region identifier from the memory handle;
identifying an entry in a translation protection table (TPT), the entry having a corresponding physical address of a memory;
determining if the generated protection domain corresponds to a value in a protection domain field of the entry;
determining if the generated region identifier corresponds to a value in a region identifier field of the entry; and
if the generated protection domain corresponds to a value in a protection domain field of the entry, and if the generated region identifier corresponds to the value in the region identifier field of the TPT, allowing access to the memory at the physical address.

2. The method of claim 1, wherein the memory handle includes a key portion and a handle portion.

3. The method of claim 2, wherein said generating a region identifier from the memory handle comprises combining the key portion with a portion of the handle portion.

4. The method of claim 1, wherein the protection domain comprises a protection tag in an NGIO (New Generation Input/Output) architecture.

5. An apparatus comprising a host-fabric adapter capable of:
generating a protection domain from a virtual address and a memory handle of a descriptor associated with a data transfer request;
generating a region identifier from the memory handle;
identifying an entry in a translation protection table (TPT), the entry having a corresponding physical address of a memory;
determining if the generated protection domain corresponds to a value in a protection domain field of the entry;
determining if the generated region identifier corresponds to a value in a region identifier field of the entry; and
if the generated protection domain corresponds to a value in a protection domain field of the entry, and if the generated region identifier corresponds to the value in the region identifier field of the TPT, allowing access to the memory at the physical address.

6. The apparatus of claim 5, wherein the memory handle includes a key portion and a handle portion.

7. The apparatus of claim 6, wherein said generating a region identifier from the memory handle comprises combining the key portion with a portion of the handle portion.

8. The apparatus of claim 5, wherein the protection domain comprises a protection tag in an NGIO (New Generation Input/Output) architecture.

9. A system comprising:
at least one virtual buffer, each virtual buffer having at least one page of data; and
a host-fabric adapter capable of allowing access to one or more pages of the at least one virtual buffer by:
generating a protection domain from a virtual address and a memory handle of a descriptor associated with a data transfer request;
generating a region identifier from the memory handle;
identifying an entry in a translation protection table (TPT), the entry having a corresponding physical address of the at least one buffer;
determining if the generated protection domain corresponds to a value in a protection domain field of the entry;
determining if the generated region identifier corresponds to a value in a region identifier field of the entry; and
if the generated protection domain corresponds to a value in a protection domain field of the entry, and if the generated region identifier corresponds to the value in the region identifier field of the TPT, allowing access to the at least one buffer at the physical address.

10. The system of claim 9, wherein the memory handle includes a key portion and a handle portion.

11. The system of claim 10, wherein said generating a region identifier from the memory handle comprises combining the key portion with a portion of the handle portion.

12. The system of claim 9, wherein the protection domain comprises a protection tag in an NGIO (New Generation Input/Output) architecture.

13. An article comprising a machine-readable medium having machine-accessible instructions, the instructions when executed by a machine, result in the following:
generating a protection domain from a virtual address and a memory handle of a descriptor associated with a data transfer request;
generating a region identifier from the memory handle;
identifying an entry in a translation protection table (TPT), the entry having a corresponding physical address of a memory;
determining if the generated protection domain corresponds to a value in a protection domain field of the entry;
determining if the generated region identifier corresponds to a value in a region identifier field of the entry; and
if the generated protection domain corresponds to a value in a protection domain field of the entry, and if the generated region identifier corresponds to the value in the region identifier field of the TPT, allowing access to the memory at the physical address.

14. The article of claim 13, wherein the memory handle includes a key portion and a handle portion.

15. The article of claim 14, wherein said instructions that result in generating a region identifier from the memory handle further result in combining the key portion with a portion of the handle portion.

16. The article of claim 13, wherein the protection domain comprises a protection tag in an NGIO (New Generation Input/Output) architecture.

* * * * *

UNITED STATES PATENT AND TRADEMARK OFFICE
CERTIFICATE OF CORRECTION

PATENT NO. : 6,859,867 B1
DATED : February 22, 2005
INVENTOR(S) : Berry

It is certified that error appears in the above-identified patent and that said Letters Patent is hereby corrected as shown below:

<u>Column 9,</u>
Line 67, after "switched", delete "to".

Signed and Sealed this

Twenty-first Day of June, 2005

JON W. DUDAS
*Director of the United States Patent and Trademark Office*